United States Patent [19]

Hileman

[11] Patent Number: 5,084,944
[45] Date of Patent: Feb. 4, 1992

[54] UNIVERSAL MATERIAL CLIP

[75] Inventor: John Hileman, Youngstown, Ohio

[73] Assignee: Budd R. Brothers, Youngstown, Ohio

[21] Appl. No.: 649,548

[22] Filed: Feb. 1, 1991

[51] Int. Cl.⁵ .............................................. F16B 13/04
[52] U.S. Cl. ........................................ 24/453; 24/297; 411/508
[58] Field of Search ............... 24/326, 453, 297, 573.1, 24/336, 457, 458; 52/509, 514; 174/138 D; 411/508

[56] References Cited

U.S. PATENT DOCUMENTS

| | | |
|---|---|---|
| 1,873,292 | 8/1932 | Collins . |
| 2,159,363 | 5/1939 | Chaffee .................................. 24/453 |
| 2,223,622 | 12/1940 | Kost ................................... 24/453 X |
| 3,093,874 | 6/1963 | Rapata ................................ 24/297 X |
| 3,213,582 | 10/1965 | Reed . |
| 3,775,927 | 12/1973 | Meyer ............................... 411/508 X |
| 3,995,404 | 12/1976 | Thaw et al. . |
| 4,152,877 | 5/1979 | Green ................................. 24/326 X |
| 4,644,614 | 2/1987 | Mizusawa ............................. 24/453 |
| 4,705,442 | 11/1987 | Fucci ................................. 24/453 X |
| 4,995,605 | 2/1991 | Conville ............................. 52/414 X |

FOREIGN PATENT DOCUMENTS

| | | |
|---|---|---|
| 1500760 | 6/1969 | Fed. Rep. of Germany ...... 411/508 |
| 2834200 | 2/1980 | Fed. Rep. of Germany ...... 411/508 |

Primary Examiner—James R. Brittain
Attorney, Agent, or Firm—Harpman & Harpman

[57] ABSTRACT

A universal material clip for use in multiple panel joining in end to end relationship. The clip comprises a unitary body member with multiple dependent legs extending from a central portion. The clip is positioned on a first panel to be joined and then the panel with clip attached is engaged to a second panel wedgeably securing the first and second panels together. The clip adjusts to independent panel thicknesses thus equalizing the finished surface of the two panels.

4 Claims, 1 Drawing Sheet

UNIVERSAL MATERIAL CLIP

BACKGROUND OF THE INVENTION

1. Technical Field

This device relates to attachment and joining clips used to temporary hold adjacent work pieces together and attachments for hollow wall repair utilizing clips to hold a wall patch within an opening of a damaged wall.

2. Description of Prior Art

Prior Art devices of this type have relied on a variety of different structural configurations to engage and hold adjacent work pieces to one another for mounting, repair or permanent joining. In construction utilizing dry wall or wall board, repairs can be made to damaged portions by removing the damaged area and replacing it with a new piece of similar sized patch material supporting same within the wall surface, see for example U.S. Pat. Nos. 1,873,292, 3,213,582 and 3,995,404.

In U.S. Pat. No. 1,873,292 a plaster board, stud and lock device is disclosed uses a preshaped configured rod that can be manipulated to hold panels to support studs.

U.S. Pat. No. 3,213,582 is directed to a mounting clip for panels that uses a compound preshaped wire or rod element having a number of 90° bends with outwardly extending legs.

U.S. Pat. No. 3,995,404 discloses an attachment for hollow walls and method of repairing same. The attachment comprises a body member that grips to the marginal portion of a wall board adjacent the repair area forming in multiple use support tabs to accept a wall patch within.

SUMMARY OF THE INVENTION

A universal material joining clip to hold adjacent work pieces and panels of varying thickness to one another in longitudinal edge alignment. The clip grips each panel independently and adjusts to panel thickness in either a wedging action or clamping configuration dependent on the use and material thickness of the pieces to be joined. The clip is generally T-shaped with oppositely disposed engagement legs extending from a central portion.

DESCRIPTION OF THE PREFERRED EMBODIMENT

Figure 1:
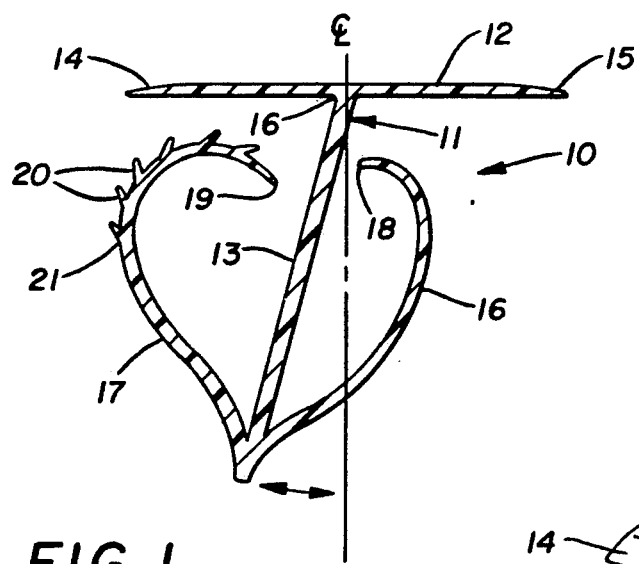
FIG. 1 is a cross-sectional view on lines 1—1 of FIG. 2 of the clip.
Figure 2:
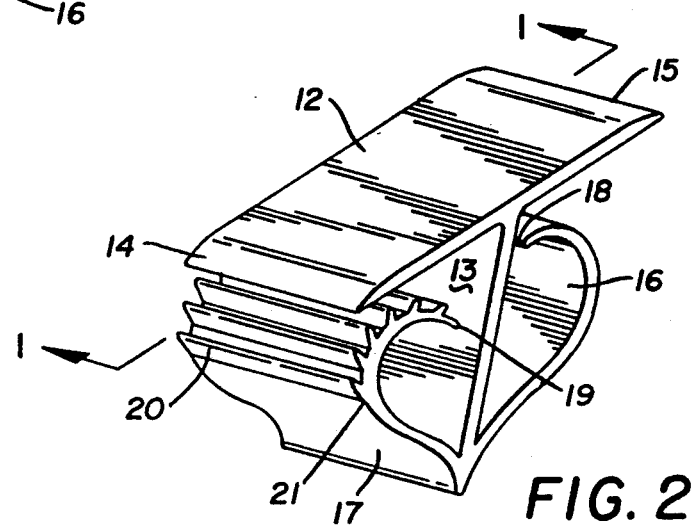
FIG. 2 is a perspective view of the clip.
Figure 3:
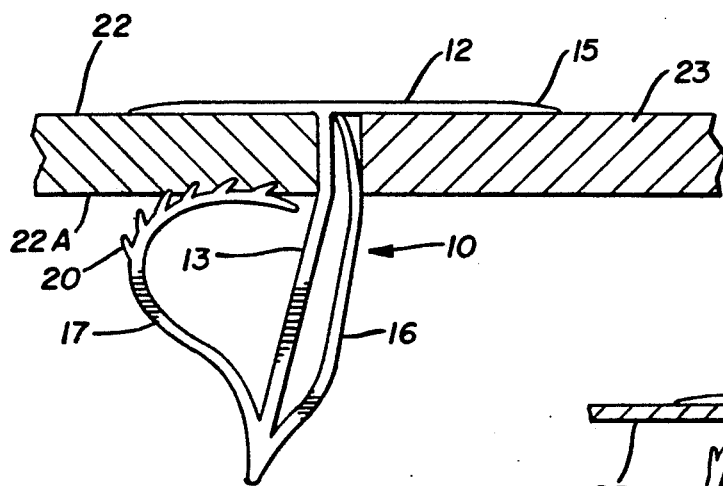
FIG. 3 is a side plan view of the invention in use.

As best seen in FIGS. 1, 2, and 3 of the drawings, a universal material clip can be seen comprising a unitary body member 11 having a generally flat, rectangular, horizontally disposed engagement portion 12 with a main support leg 13 angularly extending therefrom. The flat rectangular portion 12 is tapered along its oppositely disposed free ends 14 and 15. The support leg 13 extends angularly from a point 16 defined as midway from said respective free ends 14 and 15 of the portion 12. The support leg 13 has a pair of oppositely disposed engagement elements 16 and 17 extending from its free end.

Each of said engagement elements 16 and 17 is of a length generally equal to that of said support leg 13 and independently defines a compound curved configuration that initially extends away from said point of engagement with support leg 13 and then returns towards said support leg 13 terminating in respective free ends 18 and 19. The engagement element 17 has a plurality of longitudinally spaced transversely aligned and angularly disposed fingers 20 that extend inwardly from its free end 19 to a termination point at 21 on the engagement element 17.

The engagement element 16 is cross-sectionally tapered from its point of intersection with the support leg 13 along its length diminishing to its free end 18 as clearly seen in FIG. 1 of the drawings.

It will be seen that all of the universal clip's respective elements, the flat rectangular portion 12, support leg 13 and respective engagement elements 16 and 17 are of equal transverse dimension which provides for the required surface area needed to form an effective clip engagement surface between and on wall elements 22 and 23 to be joined as will be seen in this preferred embodiment best seen in FIG. 3 of the drawings.

In use, in this example, a dry wall repair is illustrated with the wall element 22 acting as a patch which is first engaged by the clip 10 by insertion of the wall element 22 between engagement element 17 and the rectangular portion 12. It will be apparent to those skilled in the art that multiple clips must be used and spaced around the wall elements 22 if such a wall repair is to succeed in this environment.

Upon insertion of the wall element 22 the resilient engagement element 17 deflects as shown in FIG. 3 of the drawings and the fingers 20 thereon wedgeably engage the underside of the wall elements 22 at 22A restricting removability of same by their angular alignment hereinbefore described.

The wall element 22 (wall patch in this example) with universal clips 10 attached is inserted into a repair opening by pushing on the portion 12 which deflects the engagement element 16 against the wall element 23 securing same in a wedging relation within the opening defined by the wall element 23.

It will be evident that by varying the relative length of the engagement elements 16 and 17, material of varying thickness i.e. dimensionally smaller can be accomodated in wedgeably securing relationship to one another by said clip 10.

Figure 4:
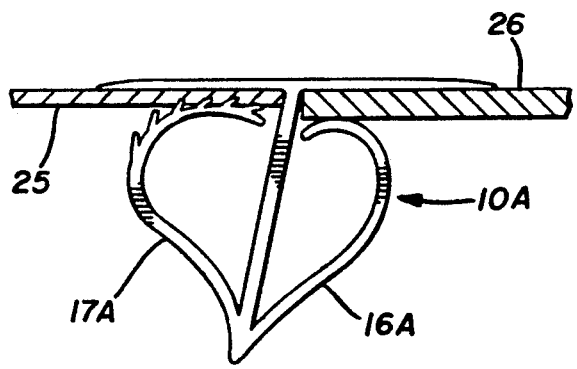
FIG. 4 is an alternate form of the invention shown in use.

Referring now to FIG. 4 of the drawings, an alternate form is shown having a clip 10A so modified which is generally identical to clip 10 except for the elongated nature of engagement element 16A and 17A. Work pieces 25 and 26 of varying thicknesses are held within the modified clip 10A by the modified engagement elements 16A and 17A by extending respectively behind the work pieces so that a temporary joining can be achieved.

It will be understood that both the preferred form of the invention and the alternate form can be preferrably formed of extruded plastic resin material in continuous fashion and cut to desired length dependent on the anticipated use requirements.

It will thus be seen that a new and novel universal material clip has been illustrated and described and that it will be evident to those skilled in the art that various changes and modifications may be made therein without departing from the spirit of the invention.

Therefore I claim:

1. A universal material clip for securing multiple panels to one another comprising a unitary body member having a flat engagement portion, a support leg extending angularly therefrom and having a free end, a pair of transversely flat engagement elements extending from the free end of said support leg, a plurality of independent multiple fingers on one of said engagement elements in spaced relation to one another, each of said engagement elements are of a cross-sectionally tapered configuration extending from said support leg and have a curved configuration throughout their longitudinal length to a free end.

2. The universal material clip of claim 1 wherein said engagement portion is of generally flat rectangular shape with tapered oppositely disposed ends.

3. The universal material clip of claim 1 wherein said unitary body member is constructed of a resilient synthetic resin material and said free ends of said engagement elements are spaced in relation to said engagement portion and said support leg.

4. The universal material clip of claim 1 wherein said engagement elements extend from the free end of said support leg in oppositely disposed curvilinear relation to one another.

* * * * *